US010532525B2

(12) United States Patent
Chau et al.

(10) Patent No.: US 10,532,525 B2
(45) Date of Patent: Jan. 14, 2020

(54) METHOD FOR PREPARING SAPPHIRE LENS AND SAPPHIRE LENS

(71) Applicant: Lens Technology (Changsha) Co., Ltd., Changsha, Hunan (CN)

(72) Inventors: Kwan Fei Chau, Hunan (CN); Qiaobing Rao, Hunan (CN); Xiaoqun Chen, Hunan (CN); Qing Zhou, Hunan (CN); Junhua Zhao, Hunan (CN)

(73) Assignee: Lens Technology (Changsha) Co., Ltd., Changsha (CN)

( * ) Notice: Subject to any disclaimer, the term of this patent is extended or adjusted under 35 U.S.C. 154(b) by 143 days.

(21) Appl. No.: 15/770,987

(22) PCT Filed: Dec. 10, 2015

(86) PCT No.: PCT/CN2015/096894
§ 371 (c)(1),
(2) Date: Apr. 25, 2018

(87) PCT Pub. No.: WO2017/071014
PCT Pub. Date: May 4, 2017

(65) Prior Publication Data
US 2018/0319109 A1 Nov. 8, 2018

(30) Foreign Application Priority Data

Oct. 27, 2015 (CN) .......................... 2015 1 0710664
Oct. 27, 2015 (CN) ...................... 2015 2 0840730 U

(51) Int. Cl.
*G02B 1/00* (2006.01)
*B29D 11/00* (2006.01)
(Continued)

(52) U.S. Cl.
CPC ........ *B29D 11/00442* (2013.01); *B29D 11/00* (2013.01); *B29D 11/0073* (2013.01);
(Continued)

(58) Field of Classification Search
CPC . G02B 1/14; G02B 3/00; G02B 1/041; G02B 1/02; G02B 1/18; G02B 1/04; G02B 1/10
See application file for complete search history.

(56) References Cited

U.S. PATENT DOCUMENTS 9,366,784 B2 * 6/2016 Bellman ................ G02B 1/115

FOREIGN PATENT DOCUMENTS

CN  101477215  7/2009
CN  101555340  10/2009
(Continued)

OTHER PUBLICATIONS

WIPO, International Search Report dated Jul. 26, 2016, in PCT/CN2015/096894, 4 pgs.

*Primary Examiner* — Joseph P Martinez
(74) *Attorney, Agent, or Firm* — Henry Patent Law Firm PLLC

(57) ABSTRACT

A method for preparing a sapphire lens includes the following steps: sequentially forming an ink layer and a coating film layer on one surface of a large polymeric membrane; laser-cutting the obtained large polymeric membrane to form two or more small polymeric membranes that are as thick as the large polymeric membrane; laminating the surface of the small polymeric membrane that does not contain the ink layer and the coating film layer to one surface of a sapphire sheet, such that an adhesive layer is formed between the small polymeric membranes and the sapphire sheet, wherein the sapphire sheet has a thickness of 0.3 to 1.5 mm, and the polymeric membrane has a thickness of 0.02 to 0.2 mm; and pressing the obtained sheet material to remove bubbles, thereby obtaining a sapphire lens.

19 Claims, 3 Drawing Sheets

(51) Int. Cl.
    *B32B 9/04*     (2006.01)
    *G02B 3/00*     (2006.01)
    *B32B 27/06*     (2006.01)
    *B32B 38/00*     (2006.01)
    *G02B 1/14*     (2015.01)
    *B32B 33/00*     (2006.01)
    *G02B 1/18*     (2015.01)
    *G02B 1/02*     (2006.01)
    *G02B 1/04*     (2006.01)

(52) U.S. Cl.
CPC .. *B29D 11/00788* (2013.01); *B29D 11/00865* (2013.01); *B32B 9/04* (2013.01); *B32B 27/06* (2013.01); *B32B 33/00* (2013.01); *B32B 38/145* (2013.01); *G02B 1/02* (2013.01); *G02B 1/041* (2013.01); *G02B 1/14* (2015.01); *G02B 1/18* (2015.01); *G02B 3/00* (2013.01); *B32B 38/0004* (2013.01); *B32B 2038/0076* (2013.01); *B32B 2307/584* (2013.01); *B32B 2309/02* (2013.01); *B32B 2309/105* (2013.01); *B32B 2309/12* (2013.01); *B32B 2551/00* (2013.01); *G02B 1/04* (2013.01)

(56) References Cited

FOREIGN PATENT DOCUMENTS

| | | |
|---|---|---|
| CN | 101767466 | 7/2010 |
| CN | 102941713 | 2/2013 |
| CN | 103744254 | 4/2014 |
| CN | 204066058 | 12/2014 |
| CN | 104536602 | 4/2015 |
| CN | 104691201 | 6/2015 |
| CN | 204575877 | 8/2015 |
| JP | 2005275294 | 10/2005 |

* cited by examiner

METHOD FOR PREPARING SAPPHIRE LENS AND SAPPHIRE LENS

TECHNICAL FIELD

The present disclosure relates to the field of sapphire processing. Specifically, the present disclosure relates to a method for preparing a sapphire lens and the sapphire lens.

BACKGROUND

Sapphire lens is being increasingly applied to various wearable products, attributing to its superior scratch-resistance performance. However, there are many bottlenecks in the processing of sapphire lens, including long processing cycle, multiple production processes, and excessively high cost, which restrict the application of sapphire lens in mobile phones and other electronic products in a large scale.

In the processing of conventional sapphire lenses, in order to fulfill the appearance requirements and usage requirements of the lenses, multiple additional processes are required following sapphire sheet molding and double-side fine polishing. These additional processes include for example, electroplating on one side of the sapphire sheet an anti-fingerprint film, and screening printing on the other side a frame shading, curing, functional ink screen printing, further curing, electroplating a coating film, and so on. The structure of the sapphire product thus prepared includes, in the thickness direction, an anti-fingerprint film layer 2, a sapphire sheet 1, a frame ink layer 5, a functional ink layer 6 and a coating film layer 7.

For example, patent application CN201410294265.7 discloses a processing method for a mobile phone panel of a sapphire material, with the following processes: material—cutting—chamfering—coarse grinding—annealing—DMP—CMP—cleaning—film coating—screen printing—finished product inspection. These processes are: i. cutting: cutting the crystal block into plate materials for subsequent processing; ii. chamfering: trimming the edges of the crystal plate into an arc shape, improving the mechanical strength of the edge of the plate, and avoiding defects caused by strain concentration; iii. coarse grinding: removing crystal plate cutting damage layer caused by crystal plate cutting and improving the flatness of the crystal plate: iv. annealing: improving the excessively great strain concentration BOW due to mechanical processing; v. DMP: improving the damage layer caused by coarse grinding and improving the surface roughness of the crystal plate: vi. CMP: improving the roughness of the crystal plate to achieve nanometer-level fineness: vii. film coating: performing anti-fingerprint film coating on the crystal plate; viii. screen printing: screen printing on one side of the crystal plate to increase light absorption. The above method can obtain a sapphire mobile phone panel that does not have damage layer on the surface and of which a roughness reaches nanometer level. Meanwhile, the above method greatly shortens the producing period, which saves production cost and increases labor productivity.

However, the multiple processes mentioned above performed on sapphire sheet still cost a rather long processing period, a low yield and thereby causing high cost for producing sapphire lens. Therefore, it is a major problem for introducing sapphire lenses into the market to reduce the complexity of the process, improve the processing efficiency and thereby reducing the production cost of the sapphire lenses.

In other words, the processing time of each sapphire lens is rather high caused by the steps of screen printing, curing and electroplating performed on the sapphire sheet, which severely limits the production capacity of sapphire lens. Therefore, there is a need in this field for a sapphire lens having a new structure instead of the sapphire lens produced by the above method to solve the problem of insufficient production capacity in sapphire lens production.

SUMMARY

In order to solve the above problem, the inventors of the present disclosure provide a method avoiding directly performing subsequence processes on the sapphire sheet, and, instead, implementing the steps of screen printing, curing and film coating integrally on a large polymeric membrane and then performing laser-cutting and laminating to produce a combined sapphire lens product.

The present disclosure provides a method for producing a sapphire lenses, the method comprising the following steps: step A, sequentially forming an ink layer and a coating film layer on one surface of a large polymeric membrane 31; step B, laser-cutting the large polymeric membrane obtained in step A to form two or more small polymeric membranes having the same thickness as the large polymeric membrane: step C, laminating a surface of the small polymeric membrane without the ink layer and the coating film layer to a surface of the sapphire sheet 1, forming an adhesive layer 4 therebetween, wherein a thickness of the sapphire sheet 1 is 0.3-1.5 mm, a thickness of the polymeric membrane 3 is 0.02-0.2 mm: and step D, performing pressure degassing on a sheet material obtained in step C to obtain the sapphire lens.

Alternatively, the sequence of step B and step A is exchanged, that is, first, the large polymeric membrane 31 is laser-cut to form two or more small polymeric membranes with the same thickness as the large polymeric membrane: then, the two or more small polymeric membranes are positioned relative to one another; and subsequently, the ink layer and the coating film layer are integrally formed on a surface of the small polymeric membranes.

In the present disclosure, for example, a certain jig is used to fix the relative positions of two or more polymeric membranes. For example, on the jig, 4 to 40 pieces, preferably 10 to 30 pieces of small polymeric membranes may be placed and fixed at the same time. The steps of ink screen printing and electroplating are simultaneously performed on the multiple pieces of small polymeric membranes. Because the sapphire sheet is not affixed to the polymeric membrane in the steps of screen printing and electroplating, the problem of high risk of breakage of the sapphire sheet caused by a long processing period is effectively avoided.

In a specific embodiment, the ink layer in step A includes a frame ink layer 5 and a functional ink layer 6; and step A includes screen printing the frame ink layer 5, curing, screen printing the functional ink layer 6, curing and electroplating the coating film layer 7.

In a specific embodiment, before step C, a step of plating an anti-fingerprint film layer 2 on the other side of the sapphire sheet 1 is included.

In a specific embodiment, the large polymeric membrane 31 in step B is cut into 4-40 pieces of small polymeric membranes.

In a specific embodiment, the gauge pressure in step D for pressure degassing is 3-10 kg, preferably 4.5 to 6.5 kg.

In a specific embodiment, the frame ink layer 5 and each the functional ink layer 6 both have a thickness of 0.01-0.03 mm; the thickness of the anti-fingerprint film layer 2 and each the coating film layer 7 is 5-20 nm; and the thickness of the adhesive layer 4 is less than 0.02 mm. In a specific embodiment, the thickness of the adhesive layer 4 in the sapphire lens is less than 0.01 mm.

In a specific embodiment, the polymer in the polymeric membrane 3 is selected from a group consisting of PC, PP, PVC, and PET; and the polymeric membrane is capable of withstanding a curing temperature of 150° C. The polymeric membrane is not deformed or deteriorated when cured at a temperature of 150° C. or above after the screen printing step.

In a specific embodiment, the polymeric membrane 3 is a film sheet, preferably a PET film sheet.

In a specific embodiment, the ratio of the thickness of the sapphire sheet 1 to the thickness of the polymeric membrane 3 is 6-30:1, preferably 10-20:1. Preferably, the thickness of the sapphire sheet 1 is 0.6-1.0 mm, and the thickness of the polymeric membrane 3 is 0.025-0.09 mm. In the present disclosure, the thickness of the polymeric membrane is preferably 0.025-0.09 mm. A polymeric membrane with a thickness of less than 0.025 mm is not conducive to screen printing while a polymeric membrane with a thickness of more than 0.09 mm may incur abnormalities such as edge burn during laser-cutting.

The present disclosure further provides a sapphire lens including, in the thickness direction, a sapphire sheet 1, a polymeric membrane 3, an ink layer and a coating film layer 7. The sapphire sheet 1 has a thickness of 0.3-1.5 mm. The polymeric membrane 3 has a thickness of 0.02-0.2 mm.

In other words, the inventors of the present disclosure provide a combined sapphire lens product that avoids performing the subsequent processes directly on the sapphire sheet and that is obtained by integrally performing the steps of screen printing, curing and film coating on the polymeric membrane, and then fixing the polymeric membrane subject to screen printing and film coating to a sapphire sheet.

Patent application CN201410311474 discloses a sapphire screen cover glass made of a sapphire super thin sheet and a soft material, wherein the sapphire super thin sheet is attached to the soft material. The preparation method for the sapphire screen cover glass is as follows: a sapphire single crystal block which has been positioned and undergone an intelligent stripping process is first polished on one surface; the sapphire is cleaved into a super thin sheet by intelligent stripping technology; the sapphire super thin sheet and the stripped sapphire single crystal block is polished on a single surface; the sapphire super thin sheet is cleaned to remove the polishing slurry left on the surface after polishing; and the sapphire super thin sheet was bonded to a soft material using a conductive adhesive to obtain a sapphire screen cover glass. In the specification of the invention, it is pointed out that when sapphire is made into very thin sheets, it exhibits good toughness. With a layer of soft material such as a resin film laminated to the bottom, the toughness of sapphire when subjected to collision is improved. Therefore, the invention retains the properties of scratch resistance and high touch sensitivity of sapphire, exhibiting the characteristics of sapphire. Moreover, since only sapphire super thin sheet is used, the production cost of the screen protection board is greatly reduced; and attributing to the application of intelligent stripping technology, the processing of sapphire super thin sheet is made less difficult. Therefore, the key point in this invention is to set the sapphire sheet as a super thin sheet having a thickness of only 0.05-0.2 mm.

In the above patent application, the soft material laminated to the sapphire super thin sheet is a resin film, polycarbonate or acrylic, and does not include a screen printed ink layer and an electroplating layer on the soft material: wherein, a certain amount of soft material is used instead sapphire of a certain thickness, so as to solve the technical problems in terms of the high price of sapphire material and the toughness of the cover glass. However, the major problem to be solved by the present disclosure does not lie in whether the sapphire material is expensive or not or whether thicker sapphire has the desired toughness. Instead, the present disclosure solves the problem of the long time cost by screen printing and electroplating the sapphire material during the process to form the ink layer and the coating film layer. Therefore, the present disclosure uses non-super thin sapphire material and polymer material that is much thinner than sapphire material. The screen printing and the electroplating steps are performed on the polymer material, each of the screen printing step and electroplating step corresponding to two or more pieces of sapphire sheets. In this way, the processing efficiency of sapphire lenses in the present disclosure is greatly improved, as well as sapphire breakage rate is reduced, thereby improving the pass rate of one-time processing.

The product of patent application CN201410311474 is a composite cover glass formed by a sapphire super thin sheet and a soft material. Even if screen printing and electroplating are performed on one surface of the composite cover glass to form an ink layer and a coating film layer, the time spent and the sapphire breakage rate during the process will still be consistent with that of the prior art in which the screen printing and electroplating steps are directly performed on the surface of the sapphire sheet, without producing any effect of improving the processing efficiency and improving the pass rate of one-time processing of sapphire lenses.

In a specific embodiment, the sapphire lens further includes an adhesive layer 4 disposed between the sapphire sheet 1 and the polymeric membrane 3. In the present disclosure, the sapphire sheet 1 and the polymeric membrane 3 are generally fixed by gluing. However, one skilled in the art can understand that the two members could also be fixed by other means such as vacuum adsorption.

In a specific embodiment, the polymeric membrane 3 is a film sheet, the film sheet being a PET film sheet.

In a specific embodiment, the ink layer includes a frame ink layer 5 and a functional ink layer 6, each of which has a thickness of 0.01-0.03 mm.

In a specific embodiment, the sapphire lens further includes an anti-fingerprint film layer 2 on the other side of the sapphire sheet 1 in the thickness direction, wherein the thickness of the anti-fingerprint film layer 2 is 5-20 nm, and the thickness of each the coating film layer 7 is 5-20 nm, the thickness of the adhesive layer 4 is less than 0.02 mm. In a specific embodiment, the thickness of the adhesive layer 4 in the sapphire lens is less than 0.01 mm.

In a specific embodiment, the thickness of the sapphire sheet 1 is 0.6-1.0 mm, and the thickness of the polymeric membrane 3 is 0.025-0.09 mm. In the present disclosure, the thickness of the polymeric membrane is preferably between 0.025 and 0.09 mm. A polymeric membrane having a thickness of less than 0.025 mm is not conductive to screen printing. A polymeric membrane having a thickness greater than 0.09 mm may incur abnormalities such as edge burn during laser-cutting. In a specific embodiment, the ratio of the thickness of the sapphire sheet 1 to the thickness of the polymeric membrane 3 is 6-30:1.

According to the present disclosure, the screen printed ink layer and the electroplated coating film layer are disposed on a polymeric membrane, so that the sapphire lens has the same scratch resistance as sapphire, and at the same time, the production efficiency of the sapphire lens can be greatly improved. The present disclosure further has the effect that pass rate of one-time processing of sapphire lens is improved, raw material utilization is improved as well as the cost for raw material is saved, and anti-bending performance and light transmittance of the sapphire lens are improved.

Figure 1:
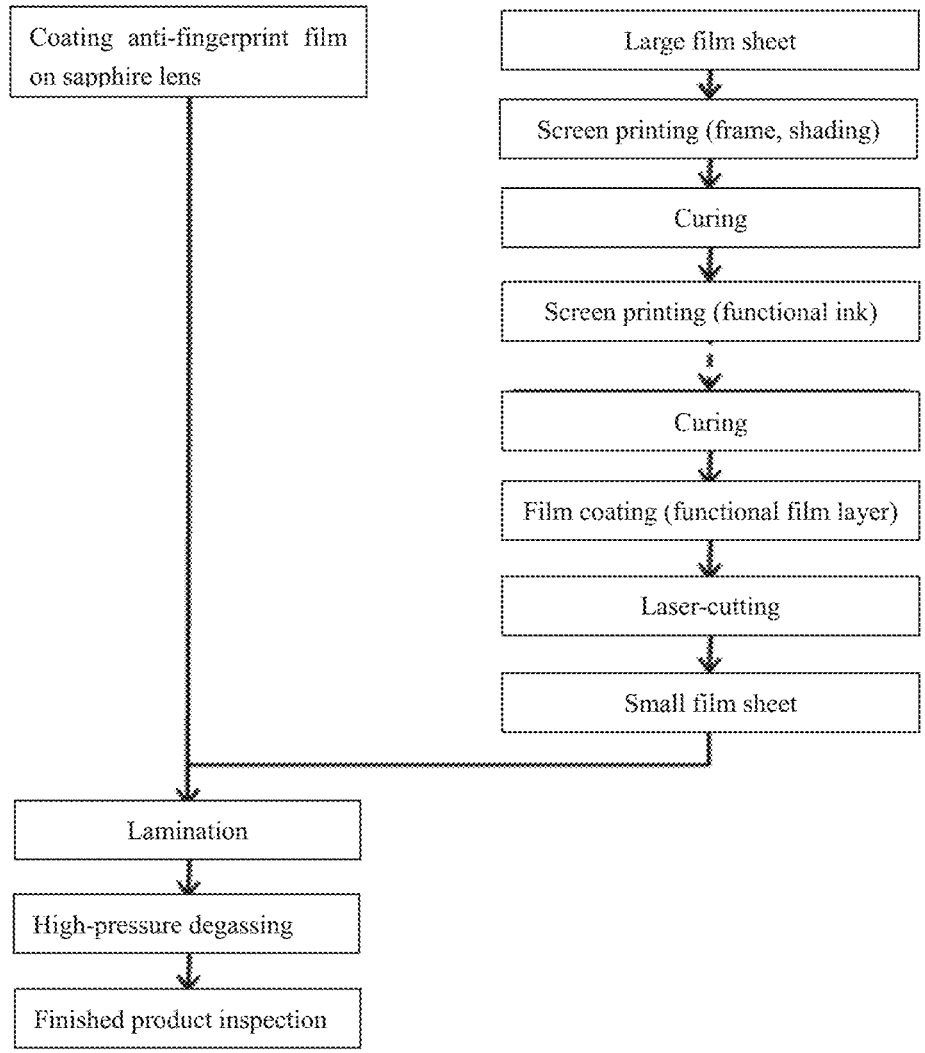
FIG. 1 is a schematic diagram of the steps of preparing a sapphire lens in a specific embodiment according to the present disclosure.

wherein, 1. sapphire sheet; 2. anti-fingerprint film layer; 3. polymeric membrane; 31. large polymeric membrane; 4. adhesive layer; 5. frame ink layer; 6. functional ink layer; 7. coating film layer.

DETAILED DESCRIPTION

The present disclosure is specifically described with reference to the following examples. The scope of the present disclosure is not limited to the following examples.

The structure of the sapphire lens in the prior art includes, sequentially in the thickness direction, an anti-fingerprint film layer, a sapphire sheet, an ink layer and a coating film layer. However, in the present disclosure, the ink layer and the coating film layer are disposed on a large piece of polymeric membrane that is subsequently cut (the thickness is kept constant and the surface area is cut smaller) and pasted on the sapphire sheet. In this way, multi-step processing of the ink layer and the coating film layer on the sapphire sheet is avoided, which greatly improves the production capacity of the sapphire lens and results in better the optical and mechanical properties of the obtained product comparing to the sapphire lens of the same thickness in the prior art. In a specific embodiment, the polymeric membrane can withstand a curing temperature of 150-200° C. In the present disclosure, the ink layer and the coating film layer are disposed on the polymeric membrane. Thus, the selected polymeric membrane needs to undergo a cure at a high temperature of 150-200° C. after ink screen printing.

As will be understood by one skilled in the art, each film includes two basic components: a single-layer or multi-layer emulsion layer and an emulsion layer support (film base), the film base being most-commonly composed of PC, PP, PVC or PET. The polymeric membrane in the present disclosure may use a film that does not contain an emulsion layer or a commercially available film sheet. The film sheet may be a film sheet that does not include an adhesive or a film sheet that has an adhesive on a single side. For example, a commercially available film sheet that has an adhesive on a single side is used in the present disclosure to be laminated to a sapphire sheet 1, forming the adhesive layer 4 therebetween after subjected to high-pressure degassing. Alternatively, in the present disclosure, a commercially available film sheet that does not include an adhesive is bonded to a sapphire sheet by means of a commercially available OCA optical adhesive.

In the present disclosure, the frame ink layer is disposed in a frame area of an electronic product. The functional ink layer is mainly disposed in a hole area of the electronic product, such as an icon, a camera hole and a key hole. That is, neither of the frame ink layer and the functional ink layer is provided on the entire surface. The coating film layer is disposed on the innermost side of the sapphire lens, and is provided on the entire surface for protecting the ink layer and preventing the sapphire lens from scratch. In a specific embodiment, the frame ink layer 5 and the functional ink layer 6 both have a thickness of 0.01-0.02 mm.

The material and method parameters for preparing the anti-fingerprint film layer 2, the ink layer and the coating film layer 7 in the present disclosure could be the same as the material and method parameters to be directly applied on the sapphire sheet in the prior art. As will be understood by one skilled in the art, both the anti-fingerprint film layer 2 and the coating film layer 7 can be produced by a vacuum sputtering film coating method. The material and the properties of the anti-fingerprint film layer 2 and the coating film layer 7 could be selected according to specific needs.

In the prior art, the steps such as screen printing, curing, electroplating and the like are performed on a sapphire sheet that has been cut into a target size and shape and that has been fine polished on both sides. This not only increases the operating risk of the sapphire sheet, but, as it requires about 15 hours for performing the above steps on each piece of sapphire, greatly limits the production capacity of the sapphire lens product. The present disclosure performs the steps of screen printing, curing and electroplating on polymeric membranes, and can accordingly perform these steps on a large polymeric membrane that can be cut into multiple small polymeric membranes. The steps of screen printing, curing and electroplating are simultaneously implemented on multiple small areas on the large polymeric membrane, which greatly increases the production capacity of sapphire lens. During the process from the completion of both-side fine polishing to the formation of the sapphire lens product, the method according to the present disclosure increases the production capacity by 5 to 10 times per unit time as compared to the method provided by the prior art. In addition, the defective rate in one-time processing of the sapphire lens product in the prior art manufactured by screen printing and electroplating on sapphire sheets (the product is required to be reworked if scratches, bumps, etc. appear on the sapphire during the operation: sometimes the sapphire even has to be scrapped) is 10 to 30%. However, the use of the method according to the present disclosure is capable of reducing the defective rate in one-time processing of sapphire lens products to less than 5%. Therefore, the method provided in the present disclosure enables significant increase in the production capacity of sapphire lens product, and also significant increase in the yield in one-time processing of sapphire lenses.

In the present disclosure, there is no need to limit the area of the large polymeric membrane and the small polymeric membrane to a certain range. The small polymeric membrane is a membrane cut to have the same size or similar size as the sapphire sheet. The area of the large polymeric membrane is at least twice the size of the small polymeric membrane and can be cut into at least two pieces of the small polymeric membrane.

Figure 4:
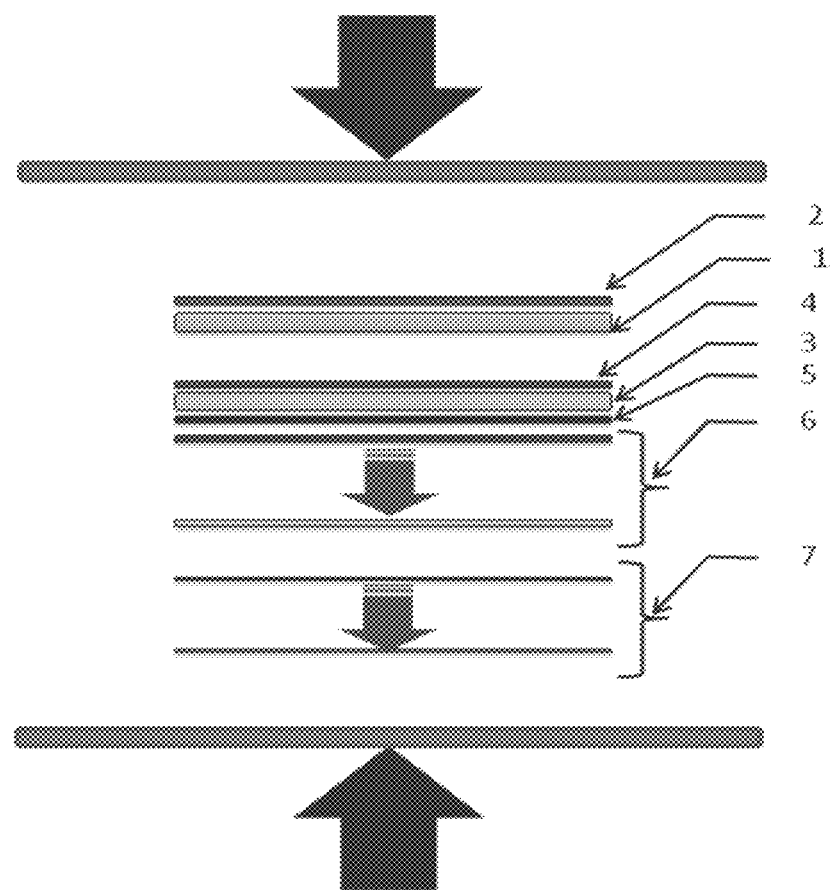
FIG. 4 is a schematic diagram of a structure of the sapphire lens product according to the present disclosure and a schematic view of the lamination between the sapphire sheet and the film sheet.

The screen printing and curing in the present disclosure are both normal process performed according to the process parameters required for various inks. The functional ink layer and the functional coating film layer may each include a structure of one layer or multiple layers formed of different materials, as shown in FIG. 4. After the polymeric membrane and the sapphire sheet are laminated together, the bubbles between the sapphire and the polymeric membrane (film) are extruded through high-pressure degassing to achieve a perfect fit.

In present disclosure, the process of plating the anti-fingerprint film on the sapphire sheet and the processes of screen printing and film coating on the film are separated, so that on the sapphire sheet after fine polishing, merely a process of film coating on a first surface is to be performed, and all the rest complex processes are performed on the film sheet. In the conventional techniques, the screen printing, curing, and electroplating are directly performed on the second surface of the sapphire sheet. The first surface and the second surface cannot be processed simultaneously. However, in the present disclosure, the production of the film sheet and the processing of the sapphire sheet can be performed simultaneously. Although the production of the film sheet takes a relatively long time, the step of plating the anti-fingerprint film on the sapphire sheet can only be performed piece by piece, while the production of the multiple small film sheets can be integrally completed on a single large film sheet. Therefore, on the whole, the processing cycle for a single piece of sapphire lens is greatly shortened, and the production capacity of the sapphire lenses is greatly improved.

In addition, the present disclosure further brings about the following beneficial effects:

1. Film sheet has good bending performance. By seamless lamination, the film sheet and the sapphire sheet form a window lens that is both scratch resistant and excellent in bending performance.

2. For producing a window lens of the same thickness, the thickness of the sapphire sheet in the present disclosure is reduced by about 10% compared to the thickness of the sapphire sheet in the prior art. The price of a single piece of sapphire is determined by its weight. Therefore, the present disclosure can reduce the cost of raw materials and improve the utilization rate of sapphire crystal ball.

3. The processes of printing and film coating of the window lens in the present disclosure are completed on the film sheet. The price of the film sheet is much lower than that of sapphire. Thus, by emitting the processes such as printing and film coating on the back of sapphire, the number of turnover of the sapphire product is reduced, which reduces the risk of causing chipping and scratches of the sapphire and greatly improves the yield in one-time processing of the sapphire lens.

4. In the present disclosure, the screen printing and the film coating are performed on multiple pieces on a single large film sheet. This reduces the number of product loading and picking and placing, and thus, greatly reduces processing hours and labor hours as well as manpower input.

5. In the present disclosure, after the screen printing and electroplating of the film, laser cutting method is used at a laser cutting accuracy above 0.01 mm, which meets the accuracy requirements of all customers on the market. The laser machine employs CCD capture positioning and automatic cutting, which further reduces labor hours and manpower input. The CCD positioning and laminating is implemented by automatic lamination equipment having a lamination precision up to 0.02 mm, so that the sapphire and the film sheet are in a state of perfect fitting. When the lamination is completed, a high-pressure degassing process is performed so that small bubbles remained between the sapphire and the film sheet are extruded by a high pressure, with no bubble seen to be remaining in the laminated product. The light transmittance of the laminated product is increased by 8% to 10%, and the bending stress increased by 10% to 15% comparing to the sapphire lens of the same thickness in the prior art.

Example 1 and Comparative Example 1

Figure 2:
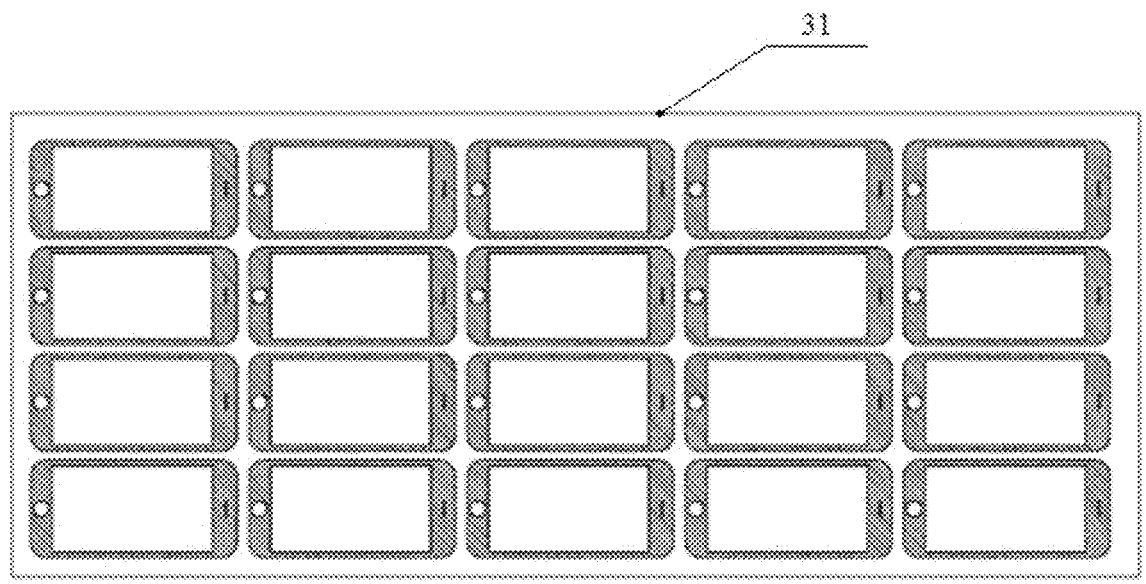
FIG. 2 is a schematic diagram of the appearance of a large film sheet on which an ink layer is screen printed and a coating film layer is electroplated.
Figure 3:
FIG. 3 is a schematic diagram of the appearance of a small film sheet formed by laser-cutting.

The structure of the sapphire lens in Comparative Example 1 includes, sequentially in the thickness direction, the anti-fingerprint film layer 2, the sapphire sheet 1, the frame ink layer 5, the functional ink layer 6 and the coating film layer 7. The structure of the sapphire lens in Example 1 includes, sequentially in the thickness direction, the anti-fingerprint film layer 2, the sapphire sheet 1, the adhesive layer 4, the polymeric membrane 3, the frame ink layer 5, the functional ink layer 6 and the coating film layer 7. The difference between the preparing method of Example 1 and the preparing method of Comparative Example 1 lies in the following aspects. In Comparative Example 1, the cut and polished sapphire sheet 1 is electroplated with the anti-fingerprint film layer 2 and screen printed and electroplated on the other side to sequentially produce the frame ink layer 5, the functional ink layer 6 and the coating film layer 7. In Example 1, screen printing and electroplating are performed on the large polymeric membrane 31. The pattern of 20 small polymeric membranes screen-printed on the same large polymeric membrane is shown in FIG. 2. After the coating film layer 7 is produced, the large polymeric membrane is laser-cut into 20 small polymer membrane s each of which is laminated to a sapphire sheet 1 in one-to-one correspondence. Before the lamination, the step of electroplating the anti-fingerprint film layer 2 on the sapphire sheet 1 is completed. The sapphire lens is obtained by high-pressure degassing the sheet material.

The specifications of a sapphire lens product are based on the requirements of the customer for the window lens. In the present example and the comparative example, the total thickness of the window lens is designed to be 0.8 mm. In Example 1, the thickness of the film sheet containing an adhesive is 0.075 mm, and the thickness of the sapphire lens set to be 0.725 mm. In Example 1, first, a plurality of product frames are screen-printed on a large piece of film sheet, that is, the outer frames of a plurality of products are simultaneously screen-printed on the large piece of the film sheet. The total thickness of the film sheet having an adhesive employed in this example is 75 μm, in which the PET layer is 50 μm and the OCA layer is 25 μm. The film sheet material is covered with a heavy release film (removed at the lamination step) having a thickness of 100 μm. The length and width of the product frame can be defined as desired. The laser-cut uses a $CO_2$ laser device manufactured by Han's Laser, with a cutting speed of 4-10 mm/s and a laser energy controlled to 10-30 W. CCD is used for aligning and laminating in the lamination step. Specifically, a film applicator manufactured by And a Automation is used, which can automatically perform grasping and laminating at a lamination accuracy of 0.02 mm. During the high-pressure degassing, different degassing parameters are employed depending on the polymeric membrane and OCA. For example, the degassing pressure is between 4.5 kg and 6.5 kg.

TABLE 1

| | Comparative Example 1 | | Example 1 | | |
|---|---|---|---|---|---|
| Number | Bending stress (MPa) | Thickness (mm) | Bending stress (MPa) | Sapphire thickness (mm) | Film sheet thickness (mm) |
| Average value | 924 | 0.806 | 1029 | 0.733 | 0.075 |
| 1 | 961 | 0.805 | 834 | 0.732 | 0.075 |
| 2 | 890 | 0.805 | 929 | 0.734 | 0.075 |
| 3 | 991 | 0.807 | 1176 | 0.734 | 0.075 |
| 4 | 1010 | 0.806 | 938 | 0.730 | 0.075 |
| 5 | 1006 | 0.805 | 959 | 0.735 | 0.075 |
| 6 | 901 | 0.806 | 1298 | 0.731 | 0.075 |
| 7 | 894 | 0.806 | 1145 | 0.735 | 0.075 |
| 8 | 920 | 0.806 | 936 | 0.731 | 0.075 |
| 9 | 844 | 0.808 | 1122 | 0.730 | 0.075 |
| 10 | 835 | 0.806 | 1090 | 0.733 | 0.075 |
| 11 | 891 | 0.809 | 990 | 0.735 | 0.075 |
| 12 | 947 | 0.806 | 931 | 0.734 | 0.075 |

Figure 5:
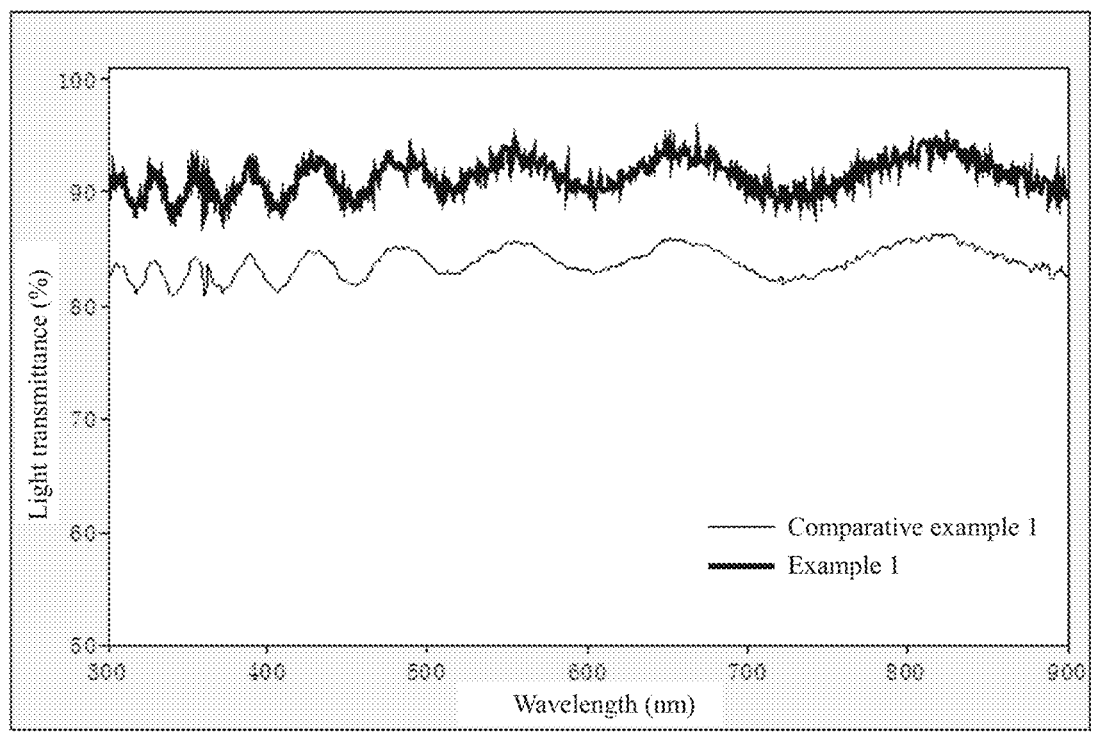
FIG. 5 is a graph of transmittance detection of the sapphire lens in Example 1 and Comparative Example 1.

In addition, the arrows at the top and bottom in FIG. 4 of the present disclosure indicate applying a pressure for the lamination to form the sapphire lens product of the present disclosure. FIG. 5 shows that the transmittance of the lens of Example 1 is 7-10% higher than that of Comparative Example 1 when the total thickness of each sapphire lens is the same. Table 1 shows a comparison between the bending stresses of Example 1 and Comparative Example 1. 12 pieces of lenses are inspected for the lenses produced by each method. According to the average result, it can be seen that the bending stress of the product provided by the present disclosure is 10%-15% higher than the bending stress of the product provided by Comparative Example 1.

The above are merely preferred embodiments of the present disclosure and are not intended to limit the present disclosure. For one skilled in the art, various changes and variations can be implemented for the present disclosure. Any modification, equivalent substitution and improvement made within the spirit and principle of the present disclosure shall be included in the scope of protection of the present disclosure.

What is claimed is:

1. A method for preparing a sapphire lens, comprising:
   sequentially forming an ink layer and a coating film layer on one surface of a large polymeric membrane,
   cutting the large polymeric membrane into two or more small polymeric membranes having a thickness that is the same with the large polymeric membrane,
   laminating a surface of the small polymeric membrane without the ink layer and the coating film layer to a surface of a sapphire sheet, forming an adhesive layer therebetween, wherein a thickness of the sapphire sheet is 0.3-1.5 mm, a thickness of the polymeric membrane is 0.02-0.2 mm, and
   pressure degassing a sheet material obtained by the laminating to obtain the sapphire lens.

2. The method according to claim 1, wherein the ink layer includes a frame ink layer and a functional ink layer, and sequentially forming an ink layer and a coating film layer on one surface of a large polymeric membrane sequentially includes screen printing the frame ink layer, curing, screen printing the functional ink layer, curing and electroplating the coating film layer.

3. The method according to claim 1, wherein before the laminating, the method further comprises coating an anti-fingerprint film layer on the other surface of the sapphire sheet.

4. The method according to claim 1, wherein the large polymeric membrane is cut into 4-40 pieces of small polymeric membranes.

5. The method according to claim 1, wherein a gauge pressure for the pressure degassing is 3-10 kg.

6. The method according to claim 1, wherein the frame ink layer and each the functional ink layer both have a thickness of 0.01-0.03 mm, the anti-fingerprint film layer and each the coating film layer both have a thickness of 5-20 nm, and the adhesive layer has a thickness of less than 0.02 mm.

7. The method according to claim 1, wherein a polymer of the polymeric membrane is selected from a group consisting of PC, PP, PVC and PET, and the polymeric membrane is capable of enduring a curing temperature of 150° C.

8. The method according to claim 7, wherein the polymeric membrane is a PET film sheet.

9. The method according to claim 1, wherein a ratio of the thickness of the sapphire sheet to the thickness of the polymeric membrane is 6-30:1.

10. A sapphire lens comprising, sequentially in a thickness direction, a sapphire sheet, a polymeric membrane, an ink layer and a coating film layer, the sapphire sheet having a thickness of 0.3-1.5 mm, the polymeric membrane having a thickness of 0.02-0.2 mm.

11. The sapphire lens according to claim 10, wherein the sapphire lens further comprises an adhesive layer interposed between the sapphire sheet and the polymeric membrane.

12. The sapphire lens according to claim 10, wherein the polymeric membrane is a film sheet that is a PET film sheet.

13. The sapphire lens according to claim 10, wherein the ink layer includes a frame ink layer and a functional ink layer, the frame ink layer and each the functional ink layer both have a thickness of 0.01-0.03 mm.

14. The sapphire lens according to claim 10, wherein the sapphire lens further comprises, in a thickness direction, an anti-fingerprint film layer (2) on the other surface of the sapphire sheet opposite the surface on which the polymeric membrane is attached, the anti-fingerprint film layer having a thickness of 5-20 nm; each the coating film layer has a thickness of 5-20 nm, and the adhesive layer has a thickness of less than 0.02 mm.

15. The sapphire lens according to claim 10, wherein the sapphire lens has a thickness of 0.6-1.0 mm, the polymeric membrane has a thickness of 0.025-0.09 mm, and a ratio of the thickness of the sapphire sheet to the thickness of the polymeric membrane is 6-30:1.

16. The method according to claim 1, wherein firstly the ink layer and the coating film layer are formed on the one surface of the large polymeric membrane, and then the large polymeric membrane is cut into the two or more small polymeric membranes.

17. The method according to claim 1, wherein firstly;
   the large polymeric membrane is cut into the two or more small polymeric membranes, a relative position of the two or more small polymeric membranes is fixed, and then the ink layer and the coating film layer are sequentially integrally formed on a surface of the small polymeric membranes.

18. The method according to claim 1, wherein a ratio of the thickness of the sapphire sheet to the thickness of the polymeric membrane is 10-20:1.

19. The method according to claim 1, wherein the thickness of the sapphire sheet is 0.6-1.0 mm, and the thickness of the polymeric membrane is 0.025-0.09 mm.

* * * * *